(12) United States Patent
Redmond

(10) Patent No.: US 8,297,686 B2
(45) Date of Patent: Oct. 30, 2012

(54) INFLATABLE ELECTRIC AND HYBRID VEHICLE SYSTEM

(76) Inventor: Scott Douglas Redmond, San Francisco, CA (US)

( * ) Notice: Subject to any disclaimer, the term of this patent is extended or adjusted under 35 U.S.C. 154(b) by 1120 days.

(21) Appl. No.: 12/187,319

(22) Filed: Aug. 6, 2008

(65) Prior Publication Data

US 2009/0043438 A1   Feb. 12, 2009

Related U.S. Application Data

(60) Provisional application No. 60/954,035, filed on Aug. 6, 2007.

(51) Int. Cl.
*B60K 7/00* (2006.01)
(52) U.S. Cl. .............................. 296/187.02; 296/187.03
(58) Field of Classification Search ............. 296/187.03, 296/187.02, 107
See application file for complete search history.

(56) References Cited

U.S. PATENT DOCUMENTS

| 6,386,929 | B1 * | 5/2002 | Baker ........................ 440/12.5 |
| 7,607,499 | B2 * | 10/2009 | Egami ...................... 180/65.265 |
| 7,789,180 | B2 * | 9/2010 | Borg et al. ................... 180/89.1 |

* cited by examiner

*Primary Examiner* — John Walters
*Assistant Examiner* — James Triggs
(74) *Attorney, Agent, or Firm* — Stephen E. Zweig

(57) ABSTRACT

An inflatable electric and hybrid vehicle system, that has the features and accoutrements of traditional automotive vehicles, that is extremely safe, lightweight, inexpensive, compact and energy efficient. The system designed to be shipped by common carrier and then assembled in a few hours with a minimal amount of tools or effort. The vehicle has either an inflatable body or membrane skin with a hybrid-type or electric motor drive train as well as heating and cooling system and inflatable seats. The battery power supply utilizes banks of commonly available batteries charged by a mobile onboard charger, configured to be easily removed with agnostic software and hardware to manage the power source They are also networked via wireless communication to various base stations to allow for monitoring and exchange of battery banks quickly and efficiently.

19 Claims, 16 Drawing Sheets

INFLATABLE ELECTRIC AND HYBRID VEHICLE SYSTEM

PRIORITY FILING

This application is claiming the filing date of Aug. 6, 2007 of provisional patent application Ser. No. 60/954035.

BACKGROUND OF THE INVENTION

1. Field of Invention

Embodiments of the invention generally relate to a transportation vehicle, in particular, to the field of inflatable electric and hybrid vehicles for transportation uses.

2. Related Art

Transportation vehicles are widely utilized today, but due to the increasing cost of energy and demand for safer, inexpensive transportation, especially in remote or emerging countries there is a real need for a vehicle that is lightweight, inexpensive, and that can be shipped in conventional common carrier boxes and assembled on site quickly and easily. Traditional automotive type vehicles are heavy and constructed of, mostly, steel or other various metals and are large, inefficient, and difficult to transport to the end user. By utilizing collapsible component, inflatable materials, and avoiding almost all metal products, we have alleviated several of these shortcomings, including the facts that manufacturing is too expensive and that shipping is too expensive and specialized. Current cars are still unsafe and current Electric cars do not provide enough range. Furthermore, distribution channels are hard to set-up for alternative energy vehicles. Our solution is a vehicle that is inexpensive, is ultra-safe because it surrounds the user with a crash-dampening airbag enclosure, can flat-pack ship, is long range, and can be roll manufactured.

SUMMARY OF THE INVENTION

Integration of several technologies around a membrane structure is the cornerstone of a novel inflatable electric and hybrid vehicle system that has the features and accoutrements of traditional automotive vehicles. The vehicle has wheels, doors, windows, seats and almost all of the traditional components of modern vehicles with the benefits of being extremely safe, lightweight, inexpensive, compact and energy efficient. The system is designed to be shipped by common carrier instead of the currently used, highly specialized, industrial transport vehicle and then assembled in a few hours with a minimal amount of tools or effort.

The vehicle has an inflatable membrane body and a chassis of composite polymer, such as carbon fiber or plastic with either a hybrid-type or electric motor drive train as well as an inflatable rear-projection dashboard and inflatable seats. The chassis or frame system may be composed of cellulose fiber which is spun into a thread or string and then pultruded into die which extrudes it into a U-Shape, L-Shape or similar linear structure which could be built into a frame without concern for rust, or the problems associated with metals. A basic standard frame can have any number of different bodies attached to it at any point that the owner desires.

The battery power supply utilizes banks of commonly available consumer-class batteries configured in drawers or cassettes for easy removal with agnostic software and hardware to manage the power source and the global or regional battery depot pick-up and drop system. The energy storage system and batteries are encased in a structure that provides several safety features that protect the user from radiation, fire, excess heat, and explosion, while being lightweight and portable. The power source is also networked via wireless communication to various base stations to allow for monitoring and exchange of battery banks quickly and efficiently.

BRIEF DESCRIPTION OF THE DRAWINGS

Taking the following specifications in conjunction with the accompanying drawings will cause the invention to be better understood regarding these and other features and advantages.

The specifications reference the annexed drawings wherein.

DETAILED DESCRIPTION OF THE DRAWINGS AND PREFERRED EMBODIMENTS

While describing the invention and its embodiments, various terms will be used for the sake of clarity. These terms are intended to not only include the recited embodiments, but also all equivalents that perform substantially the same function, in substantially the same manner to achieve the same result.

Figure 1:
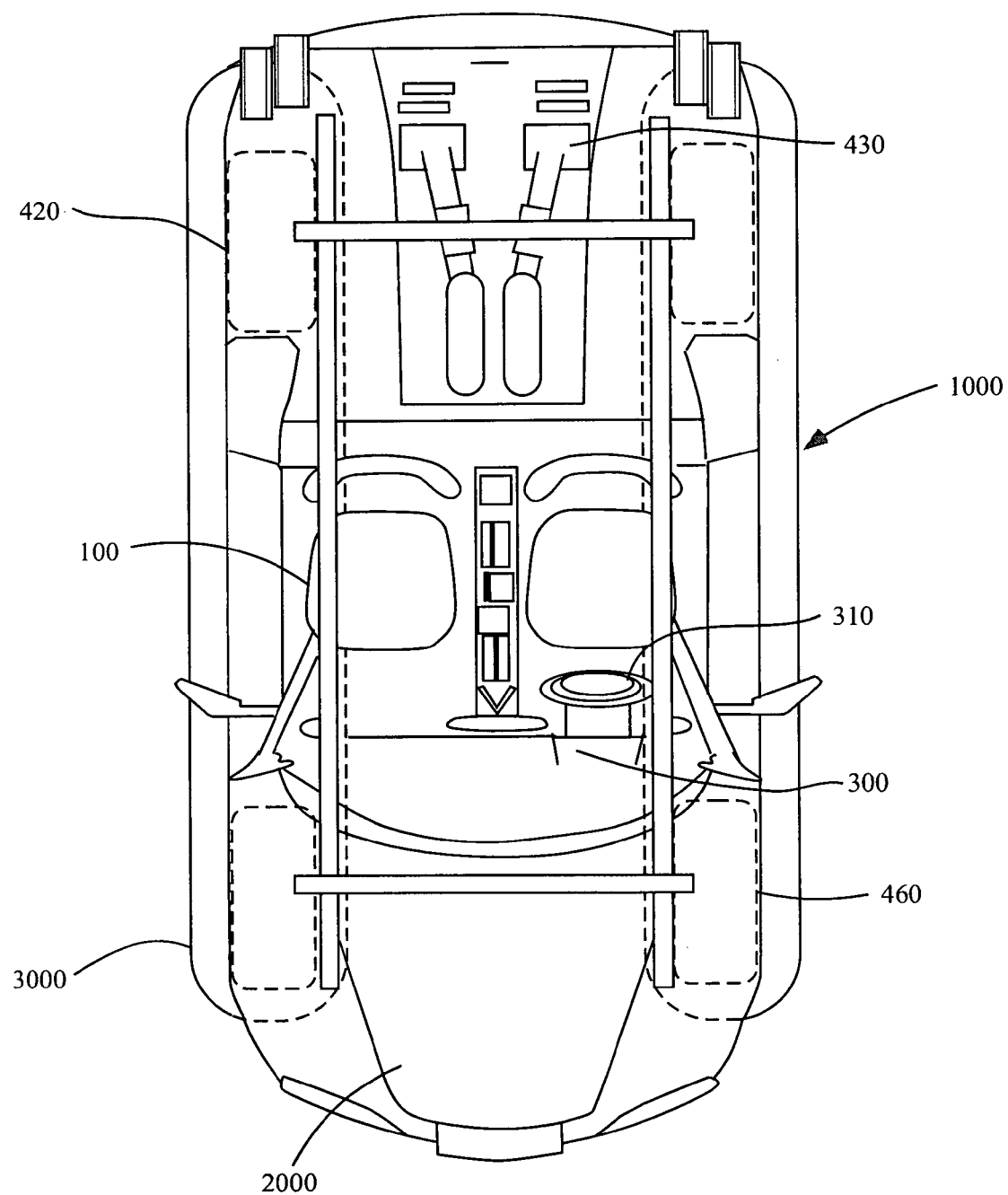
FIG. 1 is semi-transparent top view of the inflatable electric and hybrid vehicle system

A preferred embodiment of the present invention discloses an electric hybrid vehicle depicted in FIG. 1 and indicted generally by the reference number 1000 and may be referenced with the abbreviated terminology as simply the vehicle 1000. Also disclosed are the vehicle's 1000 two main components; the body 2000 and the chassis 3000. In one embodiment of the vehicle 1000 it is contemplated that the body 2000 be made of an inflatable material, similar to the construction used in Zodiac™ boats and the like. It is further contemplated that the body 3000 be formed of a pressurized seamless 3-d weave utilizing a pressure of at least 10 p.s.i. It is also contemplated that the body be filled with a substance other than pressurized gas for various applications, such as foam or possibly a liquid substance.

The vehicle 1000 is designed and dimensioned (before assembly) to fit in standard boxes that may be handled by common carriers such as UPS, FEDEX, or Roadway for example. All of the vehicles parts are light enough and small enough to achieve this end, furthermore it is contemplated that reassembly be accomplished with a minimal amount of skill, tools, or effort.

Figure 2:
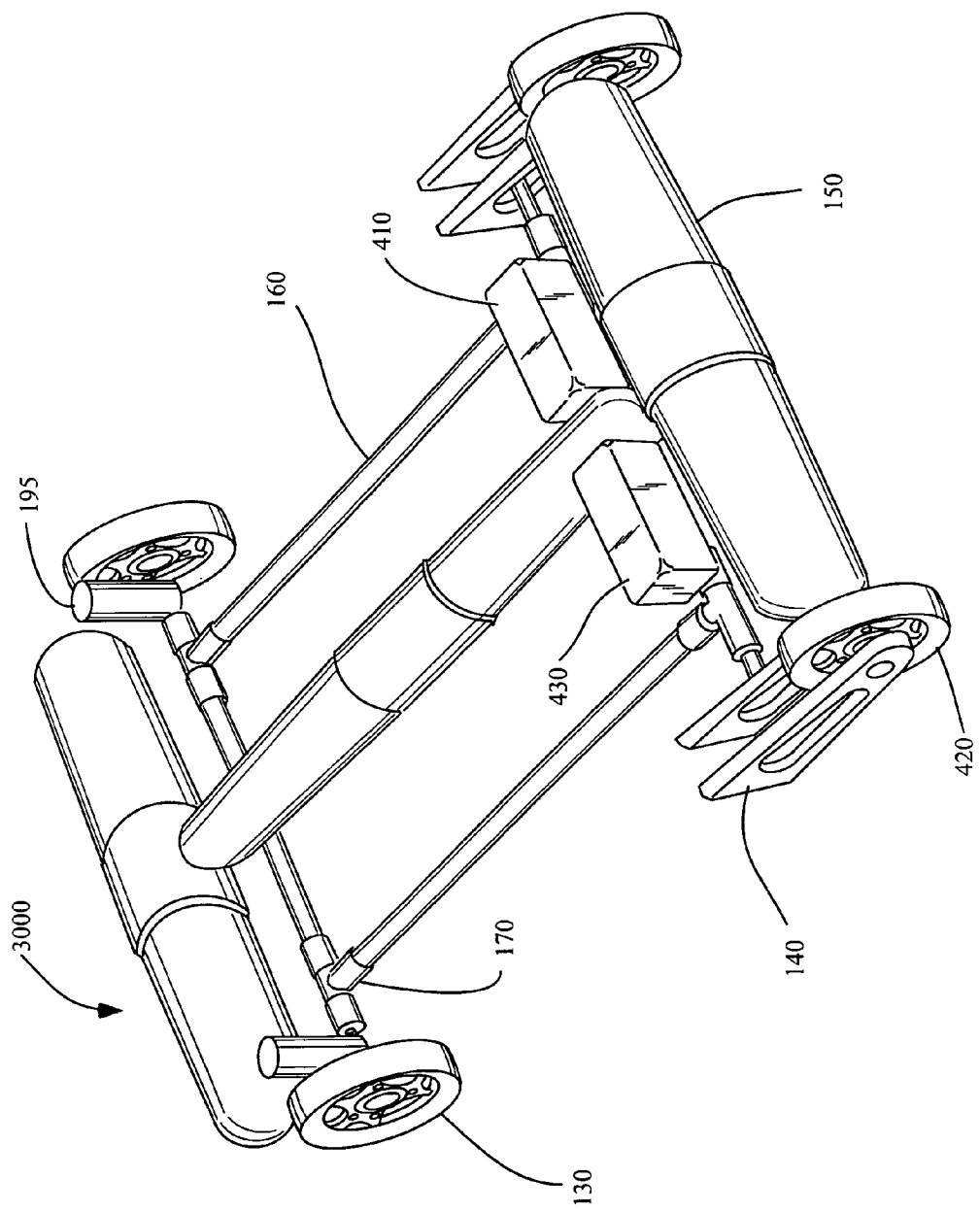
FIG. 2 is a perspective view of the inflatable electric and hybrid vehicle system's chassis system.

FIG. 2 is a perspective view of a contemplated embodiment of an electric and hybrid vehicle chassis 3000 with the body 2000 removed for clarity to demonstrate the various components of the vehicle 1000. This embodiment discloses the wheels 130, the fork based wheel mounts 140, the wheel hub motors 420, the pressurized beam structure 150, the chassis masts 160, the chassis T-corner coupling 170, the steer-by wire motor 195, the energy storage or batteries 410 and the energy conversion system 430. In one embodiment the pressurized beam structure 150 comprises several seamless 3d weave 10+ PSI sleeved tubes sealed by a metal or composite clamp at each end to form a H-shaped structural element for supporting weight and dampening shock.

Figure 3:
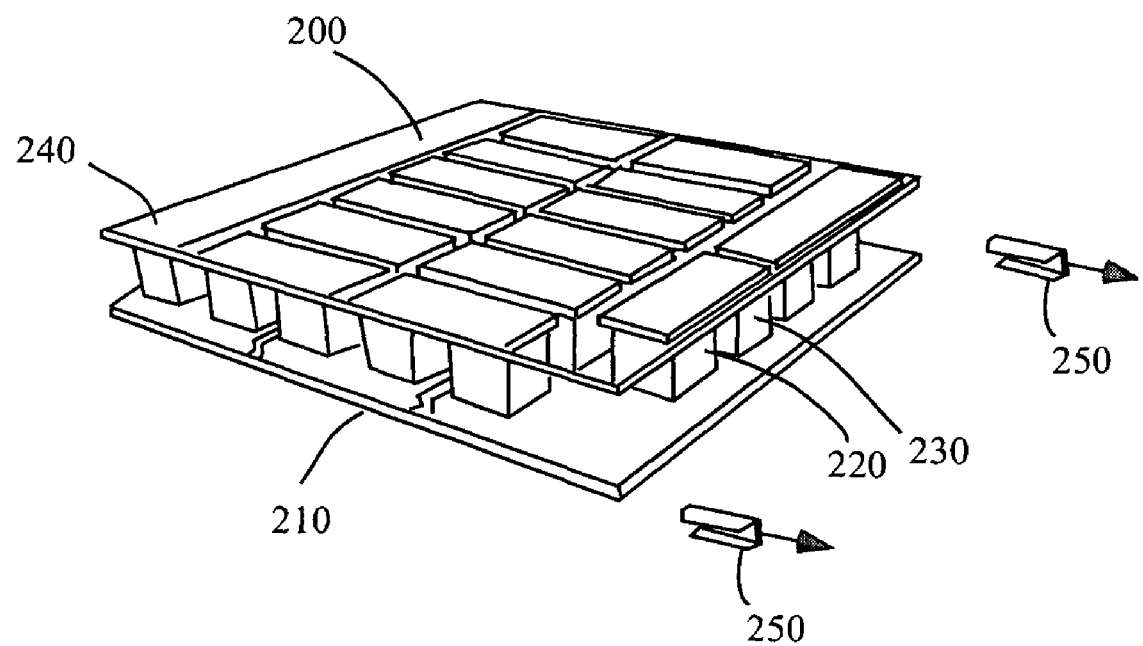
FIG. 3 is a perspective view of the inflatable electric and hybrid vehicle system's heat-to-power conversion system.

FIG. 3 is a perspective view of the vehicles heat-to-power system or heating and cooling system, that directly converts heat into electrical energy, or the reverse, in solid or liquid conductors by means of three interrelated phenomena—the Seebeck effect, the Peltier effect, and the Thomson effect—including the influence of magnetic fields upon each. The Seebeck effect concerns the electromotive force (emf) generated in a circuit composed of two different conductors whose junctions are maintained at different temperatures as indicated by a warm plate 200 and a cold plate 210 and separated by a ceramic support 240. The Peltier effect refers to the reversible heat generated at the junction between 2 different conductors when a current passes through the junction that is the N-type semiconductor 220 and the p-type semiconductor 230.

In our application, we utilize the waste heat generated by batteries 410 to warm or heat the warm plate 200. The Thomson effect involves the reversible generation of heat in a single current-carrying conductor along which a temperature gradient is maintained.

These thermoelectric modules have no moving parts and do not require the use of chlorofluorocarbons. They are inherently reliable, are virtually maintenance free, and can be operated in any orientation. Their compact size also makes them ideal for applications that are size or weight limited where even the smallest compressor would have excess capacity. Their ability to heat and cool lends them to applications where both heating and cooling is necessary or where precise temperature control is critical, such as our need.

Figure 4:
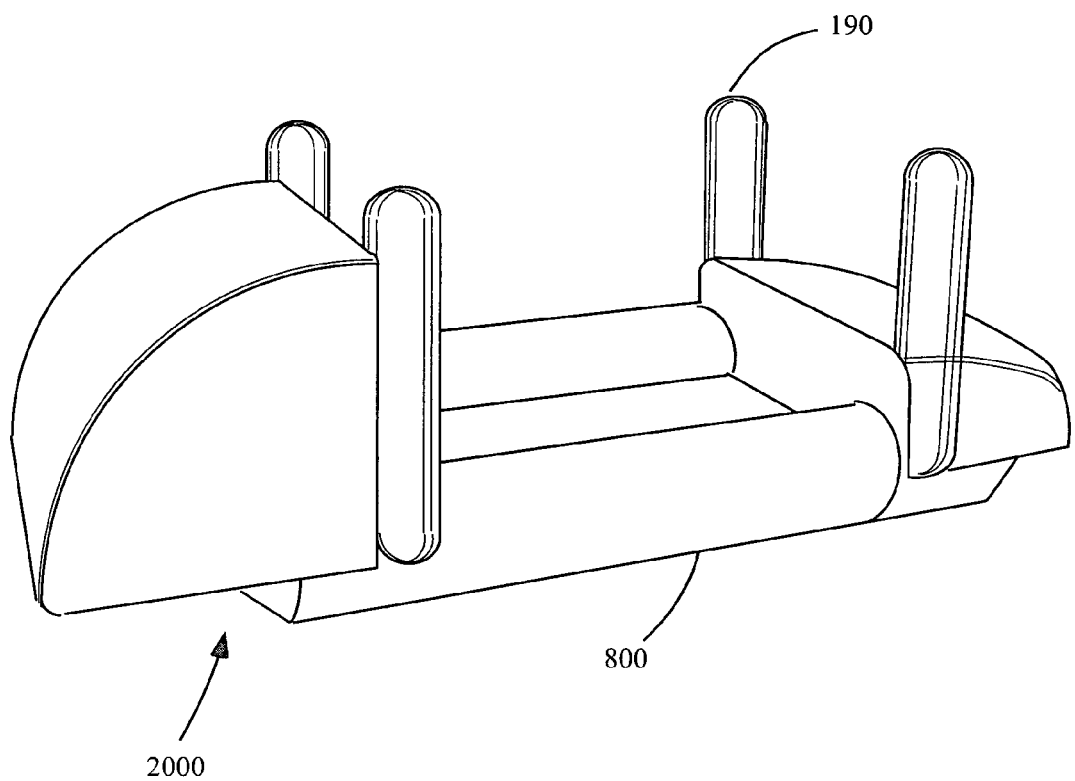
FIG. 4 is a perspective view of the inflatable electric and hybrid vehicle system's inflatable body depicting discrete modular components.

FIG. 4 is a modular view of the body 2000 to disclose the vertical roof supporting columns 190 and the floor pan assembly 800.

Figure 5:
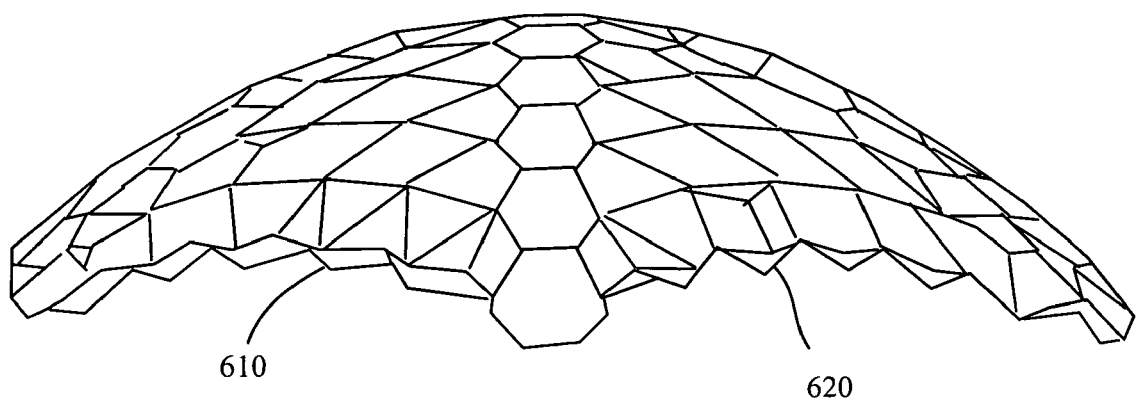
FIG. 5 is a perspective view of the inflatable electric and hybrid vehicle system's inflatable roof utilizing a stamped membrane array configuration.

FIG. 5 discloses one embodiment of a contemplated roofing structure arranged in a array structure with a roof baffle array 610 and a series one way flow control valve 620 that will seal off each individual cell in the event of puncture.

Figure 6:
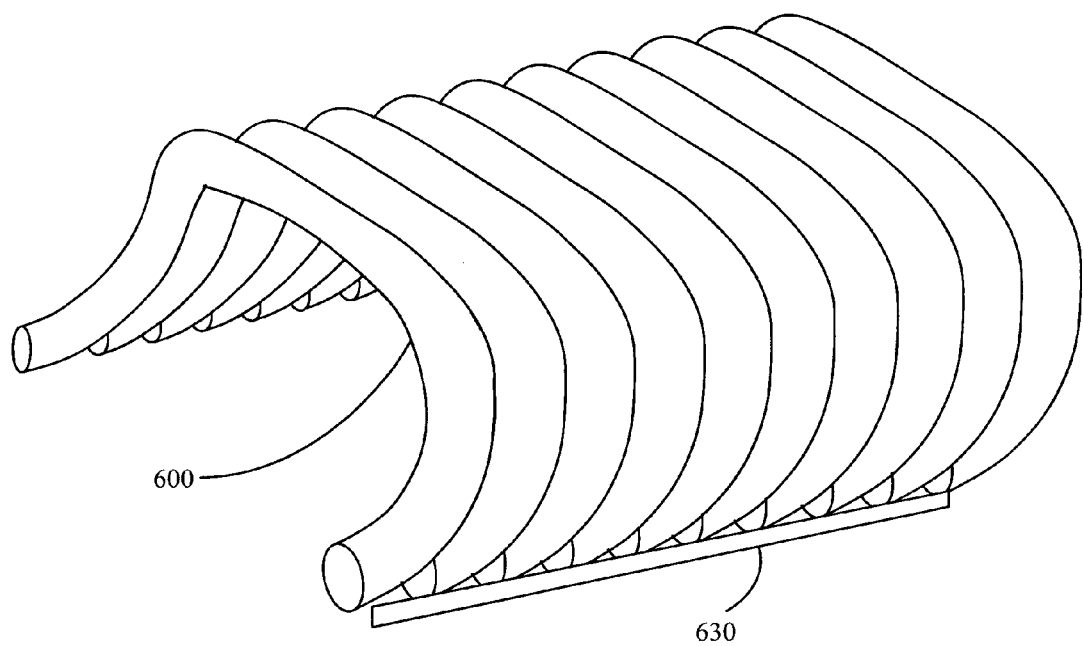
FIG. 6 is a perspective view of the inflatable electric and hybrid vehicle system's sculptured inflatable body section.

FIG. 6 is a perspective view of a body or roof section or inflatable body form section 600 with a one way valve manifold 630 which protects each cell in the event of a puncture, by sealing off each cell individually. This arrangement is beneficial in forming intricate shapes and forms, as those seen in contemporary vehicles.

Figure 7:
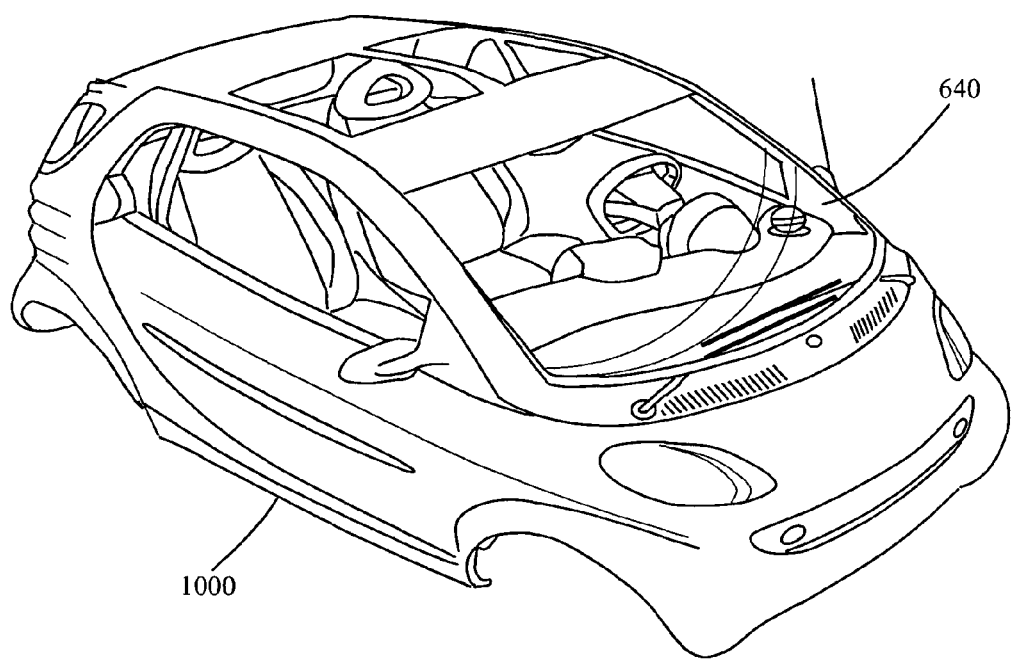
FIG.7 is a perspective view of the inflatable electric and hybrid vehicle system's body assembly.

FIG. 7 is a perspective view of the vehicle's body 2000 to illustrate that it can be manufactured to look like a traditional automobile with such features as windows or a windshield 640 which may be fabricated from nylon, poly-carbonate, vinyl or similar thin transparent material.

Another embodiment contemplates that the body 2000 be fabricated of a radiation-shielding material that protects people, animals and plants in a scalable, cost effective manner with the strength of lead-based protection but in a non-lead polymer design. The system addresses the fact that EMF may be harmful as well as the discovery that gamma and space radiation is radically reducing our health and lifespan while new technologies are, concurrently, dramatically increasing biological exposure to questionable radiation in all common home, work and urban environments. These realities along with the need to reduce exposure to lead, found in most contemporary shielding, makes our systems timely. Solar and galactic cosmic rays include protons (85 to 95 percent), helium ions (five to 14 percent), and the very dangerous high-energy heavy ions can cause cell damage that results in tumors but, more important, every cell struck by cosmic radiation causes aging. Cosmic radiation can penetrate most existing structures as if they were not there. Any given cell nucleus within a biological entity will be hit once every few days by a proton and once a month by a helium ion. That same cell will be hit once every six years both by a carbon and oxygen ion. When the full spectrum of particle radiation is included, over a multiple year period, a heavy ion would hit one in every three-cell nuclei.

Contemplated is a method to provide a panel system to stop the effects of these particles on humans, plants, animals and devices, which is modular and that can be increased or decreased in size by adding or subtracting modules Additionally, beside the cosmic radiation threat, our technology shields the occupant from created local environmental radiation. The system has been designed to use various sub-systems to provide a flexible-modular shield that can attach to any existing structure. The technology does not use lead, but does use new types of polymer integration. Our technology significantly reduces cost and increases reliability of bio protective shielding over lead and mass-based solutions. In the past, lead itself or lead-polymer composites were used to make radiation particle shielding. However, there are many problems with the use of lead. One problem with lead is that lead is toxic to living beings. Another problem with lead is that it is subject to increasingly stringent legal controls. Another issue is that lead may not have the mechanical or electrical properties desired for a given application, as in the case where lead is too heavy to be used. Lead has been used in various forms in wide range of applications: machined, as a solid casting, as a solid encased within a matrix such as a polymer matrix, or as filler. As filler, it may be lead particles, tribasic lead-sulfate or lead-oxide particles or particles of a specified shape or size, or as a mixture with other materials such as tin.

Figure 8:
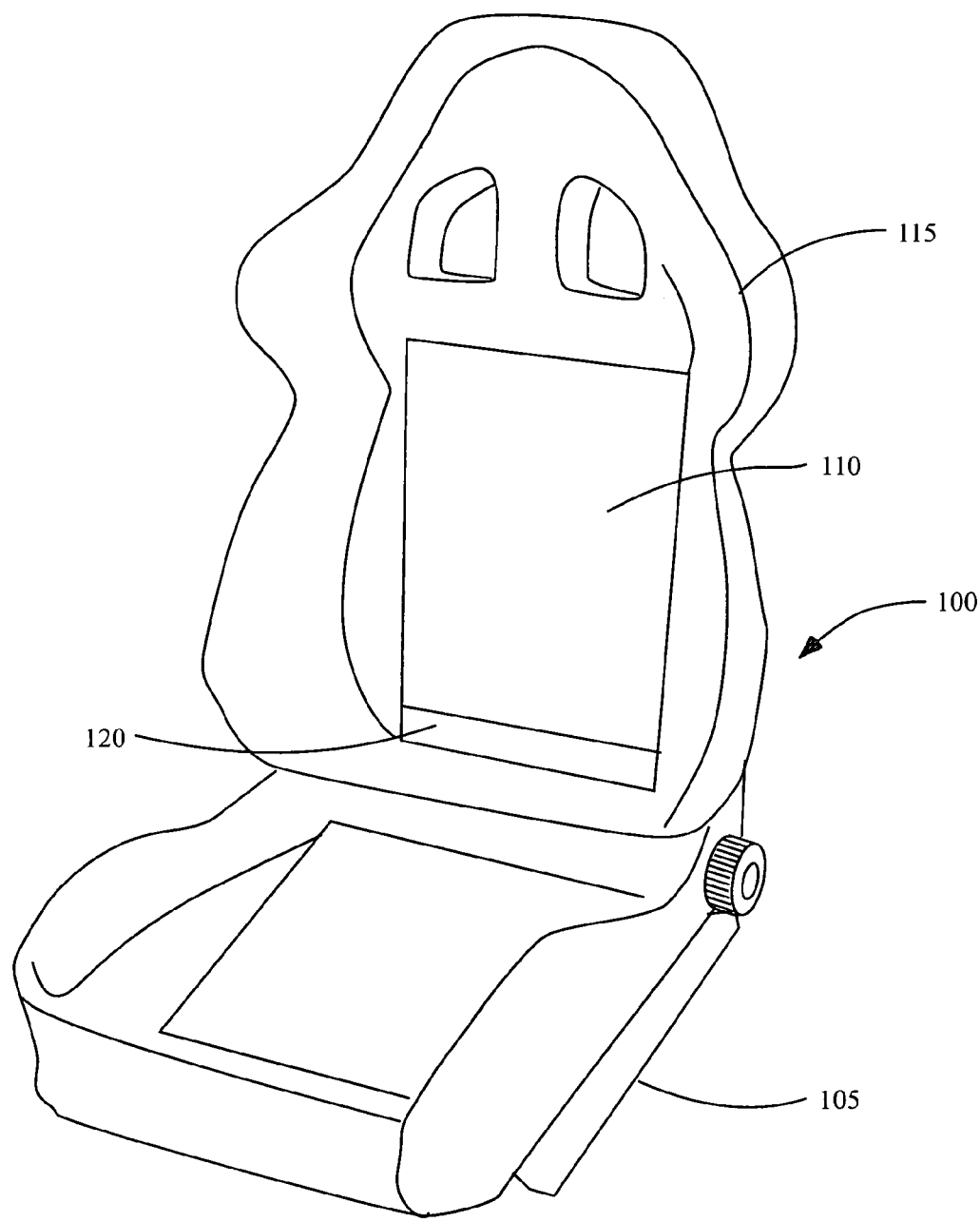
FIG. 8 is a perspective view of the inflatable electric and hybrid vehicle's inflatable seat.

FIG. 8 is a perspective view of the vehicle's 1000 inflatable seat 100 which may or may not be integrated into the body 2000 of the vehicle and could be so dimensioned and numbered to accommodate various numbers and various size riders or operators. The base of the seat rests on an inflatable height adjustment member 105 that can raise or lower the seat 100 by adding or decreasing the air pressure in the member 105 respectively. The inflatable seat 100 can contain mesh openings 110 that will allow forced air from the heating and cooling system to cool or heat the driver or passenger. The seat 100 may also contain a lumber support 120 that is an adjustable air pressurized bladder.

Also contemplated is the utilization of inflatable occupant protecting head restraints 115 which are designed to act as side restraint air bags in the event of collisions and which expand to increase occupant protection contingent on the speed of the vehicle via speed sensors. These head restraints 115 are pressurized relative to the vehicle's 1000 speed via a series of sensors, not shown, to provide protection consummate to the forces introduced during a collision.

Figure 9:
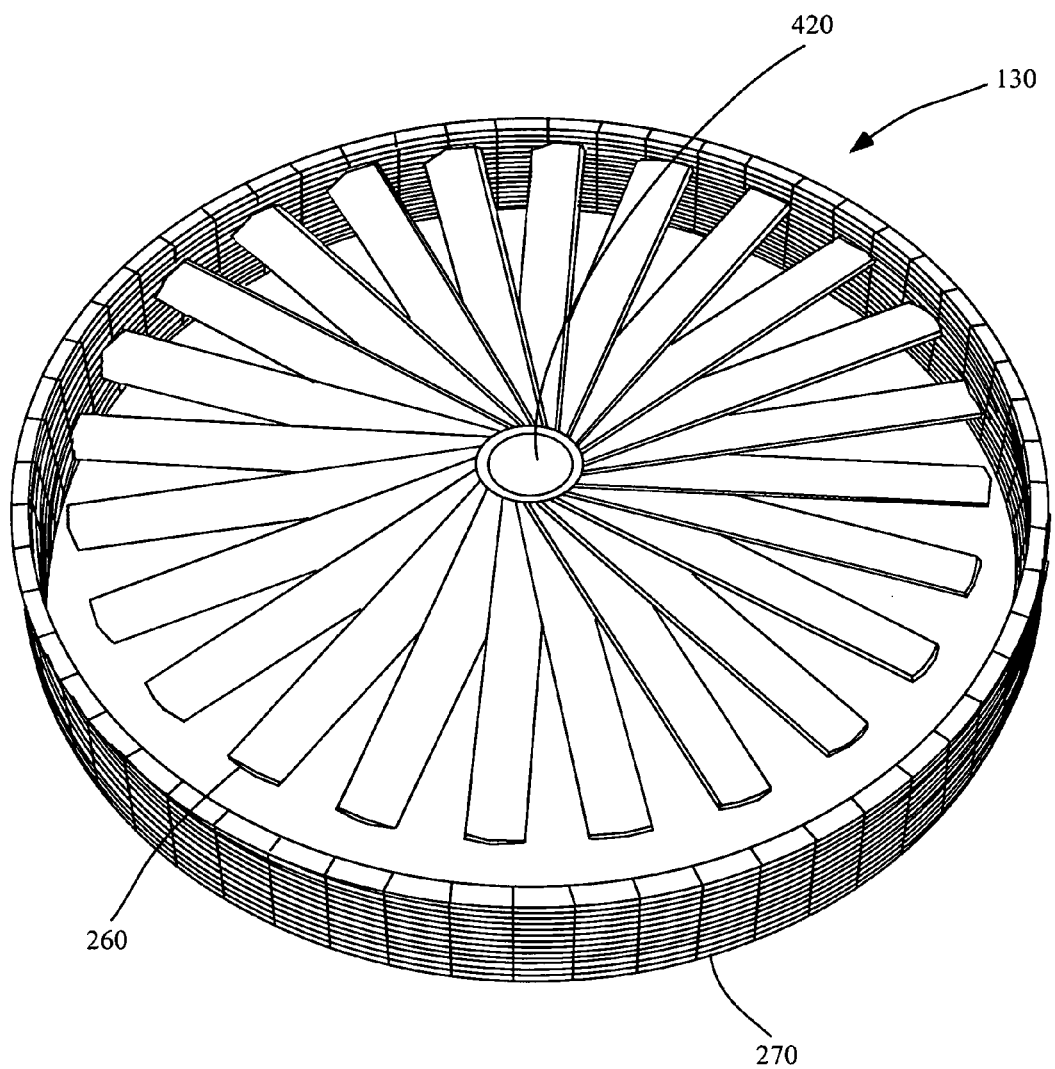
FIG. 9 is a perspective view of the inflatable electric and hybrid vehicle's collapsible wheel.

FIG. 9 discloses an embodiment of a collapsible wheel 130 that can be disassembled or folded for shipping and then easily reassembled. This embodiment is that of an iris wheel 260, with an interlocking rim 270, with a hub motor 420. The iris wheel 260 would open and close like that of a camera lens while the interlocking rim 270 would look like a flat bar until assembles, this would allow for easy shipment of the components. Another embodiment would contemplate the use of removal spokes as in a traditional bicycle wheel to achieve this end. The hub motor 420 would power each wheel 130 individually and alleviate the need for a drive axle.

Figure 10:
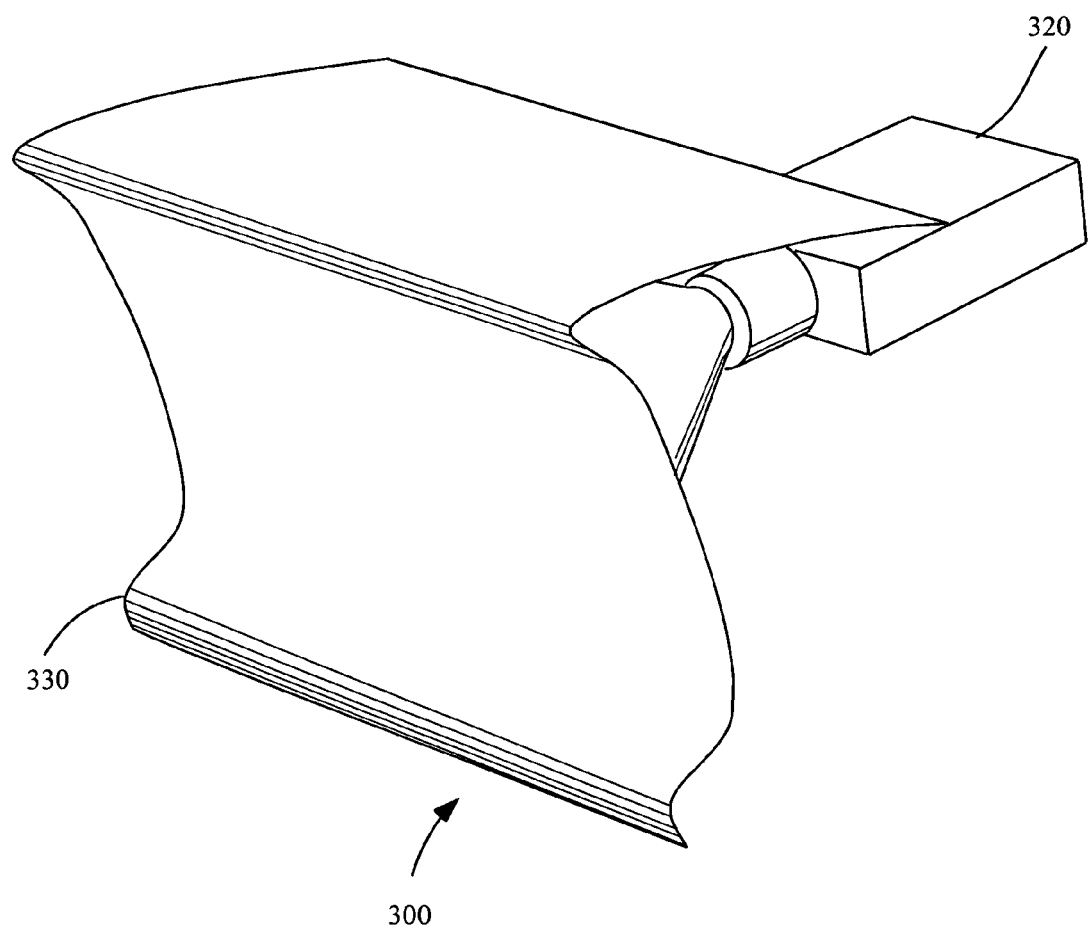
FIG. 10 is a perspective view of the vehicle monitoring system detailing its rear projection dashboard.

FIG. 10 is a perspective view of the vehicle monitoring system detailing its rear projection dashboard assembly 300, dashboard projector 320, and dashboard skin 330. The vehicle monitoring system or dashboard 300 can be an inflatable tube with the user facing side constructed of translucent fabric which can be projected upon by a rear projection system. Ideally, a miniature LCD projector or DLP projector would project the template and instruments of the dashboard as well as video for media and backup cameras. The fabric can have either touch sensitive skin or optically tracked activation points so that the user can activate functions by touching any point on the surface or a touch pad located in the cockpit nearby the drivers seat. This provides an already inflated airbag immediately in front of the driver and passengers and no hard surface as with competing dashboards, which can cause great injury.

Figure 11:
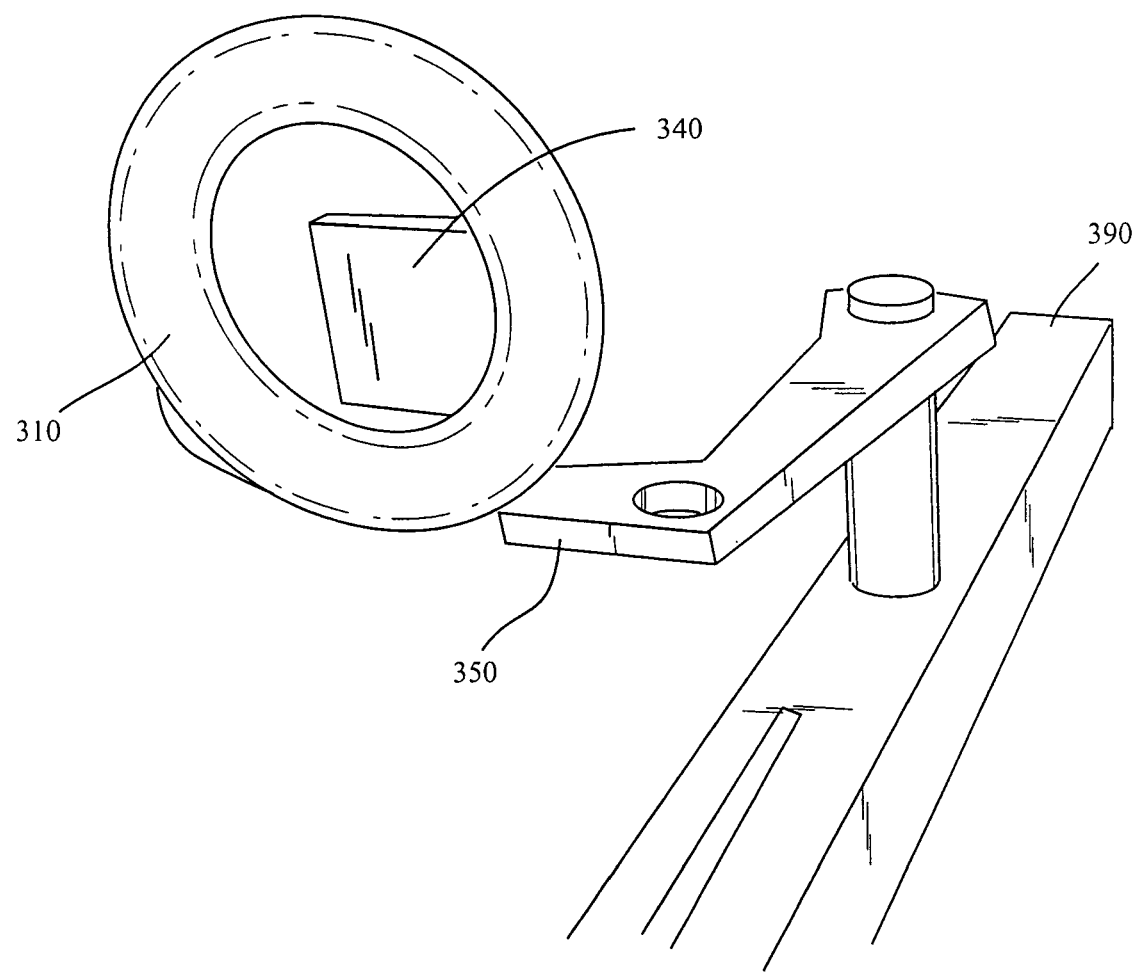
FIG. 11 is a front perspective view of the inflatable electric and hybrid vehicle control system detailing its steering wheel.

FIG. 11 is a perspective view of the vehicle's control system, which includes a steering wheel 310, as well as other controls, such as brakes and acceleration controls. The steering wheel 310 is mounted on an armature 350 to one side or the other with the preferred embodiment on the center console 370, so it can easily be positioned for use in any country for driving on either side of the road. More importantly, the drive-by-wire steering control eliminates the steering column from in front of the driver so that, in the event of a crash, there is no steering column post in front of the head or chest of the driver to impale or crush the driver. Mounted on the steering armature 350 is a touch pad 340 that can be used to control various functions on the dashboard or other control mechanisms, such as braking and acceleration.

Figure 12:
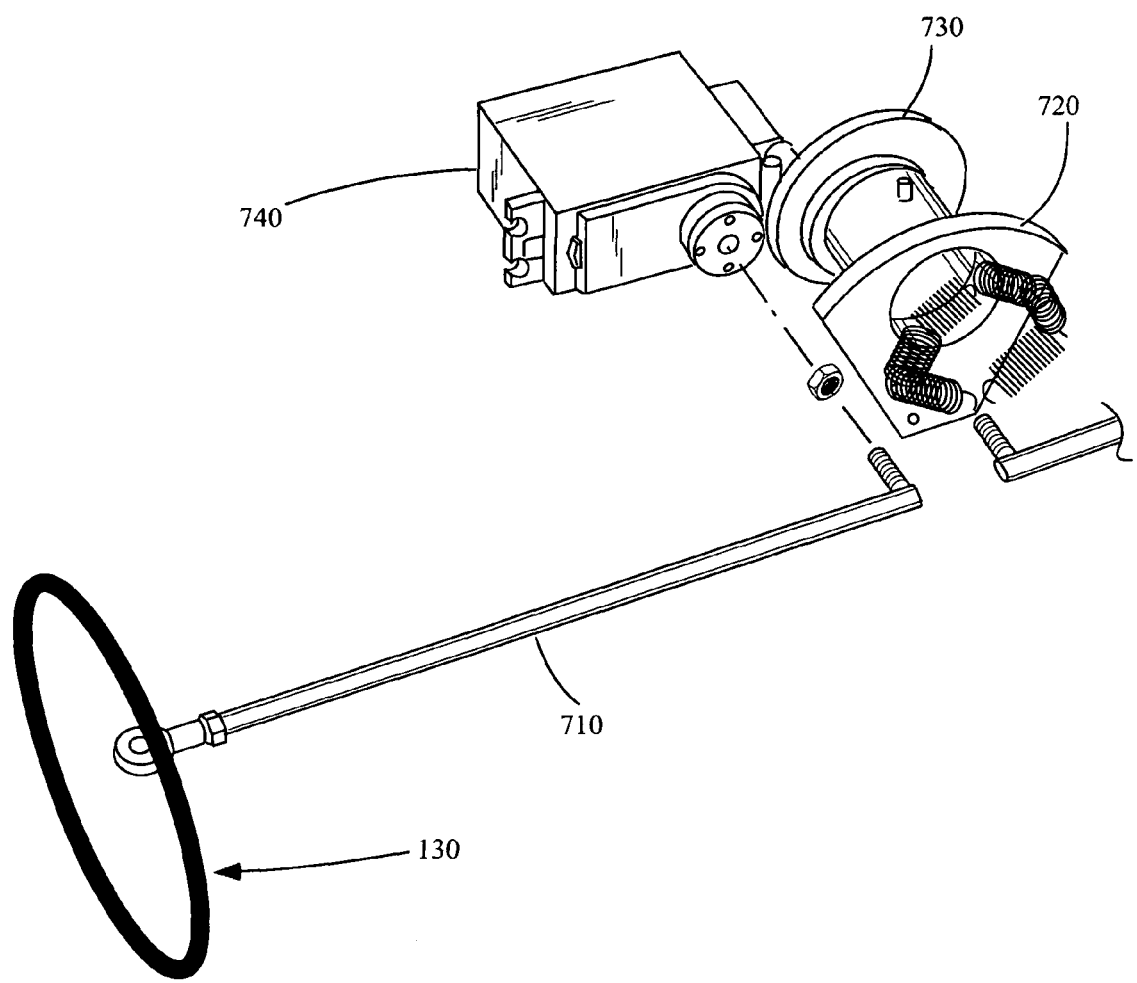
FIG. 12 is perspective view of the inflatable electric and hybrid vehicle system's drive -by-wire steering system.

FIG. 12 is a perspective view of the components of the drive-by wire steering control. Steering is controlled electronically by sensors and motors. One embodiment teaches a wheel 130 attached to a steering linkage 710 that is further connected to a, steering connection plate 720. This connection plate 720 is further connected to a steering rotation motor 730 which could be a stepper motor or alternative motor type with positioning sensors that are controlled by the, steering control head 740 which is a computer processor that interprets the input and feedback from the driver manipulating the steering wheel 310 not shown in this view.

Figure 13:
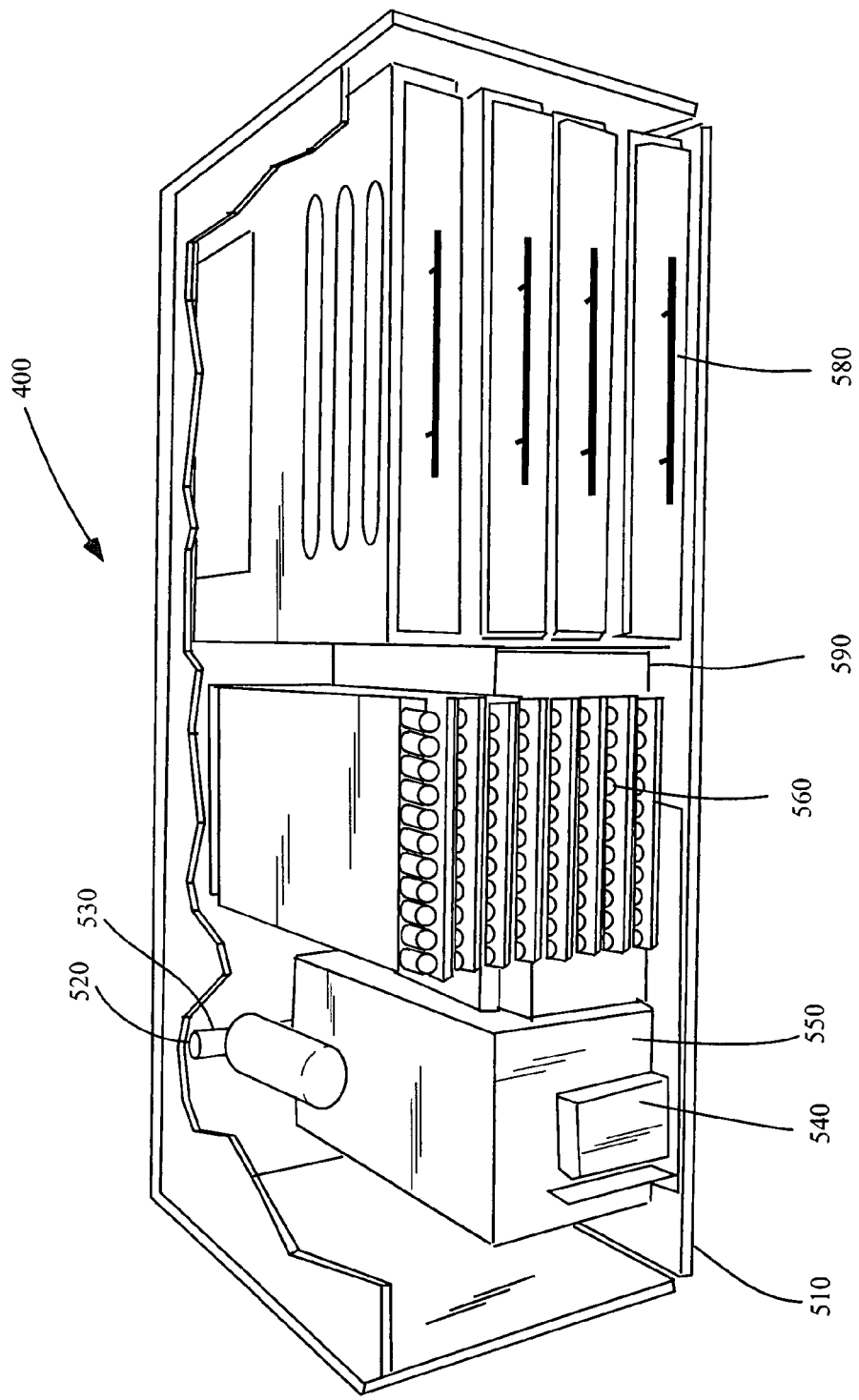
FIG. 13 is a front perspective view of the inflatable electric and hybrid vehicle energy storage system.

FIG. 13 depicts an embodiment of the energy control system assembly 400 that has the advantages of a modular design small enough to fit in any cavity or payload bay that does not require extension chords for charging, but rather uses a depot or hot-swap method of exchange.

In one embodiment, the case 510 is fabricated from a spun polymer ballistic casing. This newly developed extremely light and durable material is perfect for automotive applications and will be able to withstand a thermal runaway event in the unlikely event that one should occur due to an unrecognized cell irregularity. This material uses a layered Kevlar™, Vectran™ or similar fabric weave to fully enclose the entire assembly so that a catastrophic failure will cause no injury to the passengers only a few feet away.

Another embodiment incorporates a fire suppression system 550 utilizing a miniature pressure tank of halon gas with a thermal sensitive valve, which will release halon gas into the case 510 in the event of a fire. Also depicted are a hydrate cassette 580, a fuel cell 540.a pressure relief valve 520, and a buffer tank 530 utilized in energy storage and generation.

The battery cassettes 560 may increase in number for various applications, such as for portable rescue/charge management. One of the slots in battery cassettes 560 has a testing module to test and validate new cells. The pods of the battery cassettes 560 can each, individually, are swapped out while the unit is running and those individual pods can power devices. To address the weight of racks when moving them around for transport relative to recharge, maintenance, upgrade or monitoring it has been further contemplated that the back of the battery case tilts up via pneumatic or hydraulic struts to allow easy access to the slide in battery drawers. Each pod, or pack and case latch has hardware an electronic switch that disengages the section you are removing if you attempt to remove that section. The energy control system assembly 400 is controlled and monitored by a Battery Multiplex Array Control computer 570, or simply abbreviated and referred to as a BMA 570. This is an instantly OEM-user-re-configurable system with all data provided in average ranges. Contracted detailed engineering studies are performed for each vehicle in order to qualify the ideal settings from among a vast array of optimization parameters that our system can provide over fixed chip-based (IE: Texas Instruments) solutions. The BMA 570 has no fixed metrics. All cell specific metrics are installed in the bios when the cells are selected for and inserted into the battery cassette 560. This approach obsoletes most chip-based solutions because the BMA 570 is an operational computer.

The BMA 570 provides important advantages in over 140 basic areas including the following measurements: voltage measurement, accumulated charge measurement, and equalization. Voltage measurement is achieved with a very accurate circuit that also provides massive sequential measurements per module to reduce cost. The charge measurement circuit employs a highly accurate instant upgrade precision V/F converter in conjunction with a counter to integrate the current waveform, which reduces the frequency of measurement resetting.

Equalization is accomplished using a linear current routing circuit that boosts the charge on low voltage segment instead of the more common method of discharging higher voltage segments. FPGA Surface mount technology is used throughout to reduce volume, mass, and cost.

The BMA 570 also includes the following features: easy interconnection, communications, and control gateway, operational communications architecture for entire monitoring array, communication gateway to device host controller (SPI, I2C/SMBus, others), battery chemistry agnosticism—can include Li-Ion pack safety protection controls but may also be powered from Pb-acid, NiMH or NiCd cells, commands balancing algorithms implemented by the Individual cell monitoring for voltage (<5 mV) and temperature (1° C.) in one low-cost unit, operational directly from a single Li-Ion cell: 2.2V to 5.0V supply voltage range or its own system power, and thermal capture power,.

As well as having; low power consumption of system operation, an automatic BIOS interface, module on/off switching control among Cells, Pods & Racks, voltage measurement synchronization among Cells, Pods & Racks, data collection, data processing and communication, battery charge and current measurement, battery State of Charge (SOC) determination, safety implementation launches, system sleep state supervision, battery maintenance equipment control, scalable architecture using single-wire, isolated, bi-directional communications, simultaneous sensing of each cell voltage for precise monitoring, balancing and diagnostics, cell voltage measurements synchronized with current measurements, single cell or parallel group of cells low-cost solution for battery packs of up to 10,000 series cells, superior safety via continuous voltage and temperature monitoring on every cell, individual cell monitoring and balancing features in one complete PCB, scalable architecture using single-wire, isolated, bi-directional communications, cell voltage measurements synchronized with current measurements, ability to balance current via configuration at the circuit level, ability to recover stranded pack capacity with continuous balancing, reduced heat, maximum efficiency balancing, ability to implements various balancing algorithms-voltage, capacity, custom and/or proprietary, and Single-wire isolated, bi-directional communications architecture.

This integrated system is a low cost system with superior results because there are fewer resources dedicated to thermal management. Other features are: fault tolerant software and architecture, extension cord-free recharge, auto BIOS interface, safety implementation launches, system sleep state supervision, battery maintenance equipment control, battery agnosticism (cells can be replaced at end of cycle life with more efficient cheaper cells without the need to replace surrounding architecture), XP Vast Cell Fractal Module (VCFM)™ design, ability to work in combination with fuel cells, market tested (Commercially Available Off the Shelf) batteries, fire suppression system, transferable/mobile power that can power your house or neighborhood power grid, cellular maintenance and management at a cell by cell level, chemistry based approach to cell maintenance, modular configuration, 3 levels of safety interlocks that cannot be bypassed, recharge needs alerts, 10,000 cell capacity, superior range of over 300 miles based on motor and chassis attributes, Intelligent XP Battery BOSS™ manager, hot swappable cells, safer than stand-alone Li-ion, and instant expansion capabilities.

One embodiment of the current invention utilizes artificial intelligence methods for the BMA 570. The best Artificial Intelligence results involve neural nets, computing modeled on the architecture of the brain. Pursuing the biological paradigm further, John Holland developed genetic algorithms, computer programs that can be used to solve problems though an evolutionary process. The basic genetic algorithm has seven steps. (Classifier system, fitness, crossover, and mutation will be described soon.)
1. Express solutions as a sequence of yes-no questions (a classifier system for the problem).
2. Start with a random initial distribution of proposed solutions, sequences of answers to the yes-no questions.
3. Try each proposed solution on test case problems.
4. The fitness of each proposed solution is how well it performs on the test cases.
5. Remove the least-fit members of the population.
6. Reward the most-fit by letting them reproduce by crossover, with occasional mutation.
7. Repeat steps 3-6 on the new population.

First, a classifier system is a way to encode possible solutions in a fashion similar to the storage architecture of genetic information. Next, the fitness represents the success of a proposed solution with the test problems. Often this is thought of, at least metaphorically, as a landscape.

The first genetic operation we use is crossover. In addition, we use mutation. Evolution of electronic circuits became possible with the invention of Field-Programmable Gate Arrays (FPGA), arrays of logic cells whose functions are determined by programs loaded into the FPGA. We start with a population of 50 known old-school circuits and apply the genetic algorithm methodology: assess fitness with a test problem (distinguish in balance from out of balance cell packs), remove the least-fit programs, and let the more fit reproduce by crossover with occasional mutation.

The BMA 570 utilizes pulse sensing or cellular structure sensing that tests each battery 410 individually. A cell by cell sensing system constantly tests each cell as the system is working by cutting each cell out of the system, one after the other, testing it, and then reconnecting it to the system, all electronic.

In order to ensure that the battery cassettes 560 are charged and maintained it has been contemplated to utilize a a software management system built on top of Oracle, SAP, Siebel or similar enterprise class base code. This system would keep a national GPS map of all, locations where the depots are and all individual users who might swap batteries while in transit.

Another embodiment contemplates the use of a PCB board on the base of each battery cassette 560 utilizing solder traces to connect all of the cells and pods to a master bus. The PCB can be flipped over to switch from series to parallel connection depending on the user's needs.

The better a battery A is managed, the greater range and cycle life it will provide its user, and in achieving these economies, intelligence matters. This system manages the batteries by utilizing: an easy interconnection, communications and control gateway, operational communications architecture for entire monitoring array, communication gateway to device host controller (SPI, I2C/SMBus, others), battery chemistry agnosticism that can include Li-Ion pack safety protection controls, but may also be powered from Pb-acid, NiMH or NiCd cells. As well as commands balancing algorithms implemented by the individual cell monitoring for voltage (<5mV) and temperature (1° C.) in one low-cost unit, operational directly from a single Li-Ion cell: 2.2V to 5.0V supply voltage range or its own system power, thermal capture power, low power consumption of system operation, an automatic BIOS interface, module on/off switching control among Cells, Pods & Racks, voltage measurement synchronization among Cells, Pods & Racks, dData collection, data processing and communication,battery charge and current measurement, battery state of charge (SOC) determination, safety implementation launches, system sleep state supervision,battery maintenance equipment control,scalable architecture using single-wire, isolated, bi-directional communications, simultaneous sensing of each cell voltage for precise monitoring, balancing and diagnostics cell voltage measurements synchronized with current measurements.

Additionally it may operate on single cell, or parallel group of cells, is part of a complete low-cost solution directional communications system., cell voltage measurements synchronized with current measurements, ability to balance current via configuration at the circuit level, ability to recover stranded pack capacity with continuous balancing, reduced heat, maximum efficiency balancing, ability to implements various balancing algorithms—voltage, capacity, custom and/or proprietary Single-wire isolated, bi-directional communications architecture for battery packs of up to 10,000 series cells with superior safety via continuous voltage and temperature monitoring on every cell, while individual cell monitoring and balancing features are in one complete PCB.

Additionally, all the hardware for blue tooth communications is already included in the BMA 570 so the car can talk to a control panel in the dash or any enabled smart phone. Updates and status checks from the BMA 570 can be relayed to your cell phone via Bluetooth™ and chip-stored voice output.

A wi-Fi Connection and Bluetooth system allows connection to the internet so that the bios of the BMA 570 can be updated for each new battery and for each new improved operation curve from other drivers In an effort to increase the energy usage of the inflatable vehicle several embodiments have been contemplated to recapture vibrational energy by affixing piezo electric fabric or skin on the vehicle and then connecting the piezo electric devices to the energy storage system to convert the vibrations caused by the vehicle movement back into electrical energy.

Another embodiment contemplates utilizing the process of nano printing photovoltaic or solar cells onto the vehicle's body, to capture photovoltaic energy as electrical energy to assist in powering the vehicle.

Figure 14:
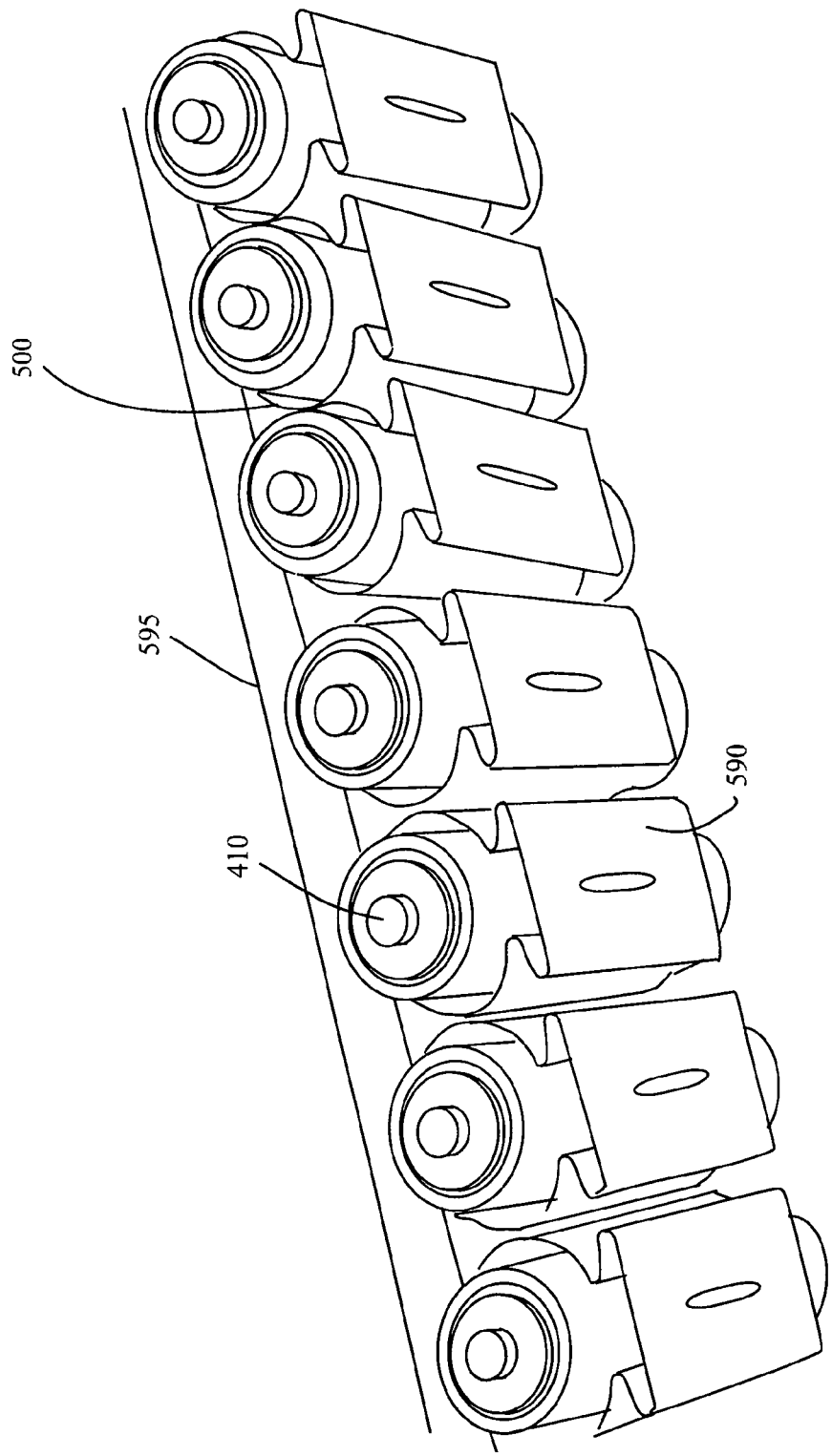
FIG. 14 is a perspective view of a typical series of batteries in the energy storage system.

FIG. 14 is a perspective view of the internal components of the battery cassette 560 of FIG. 13. A preferred embodiment has a series of common batteries 410, such as AAA, AA, C, or D cells for example mounted by a plurality of battery mount clips 590 which are mounted onto a battery thermal cooling pad 500, to help dissipate the heat generated by charging the batteries 410. Also depicted is a fiber optic battery-dimensioning sensor 595 that measures the external diameter of each battery 410 and will disconnect any battery that increases in diameter more than a specified amount. This will prevent battery 410 failure or explosion because the batteries 410 tend to expand before they explode.

Figure 15:
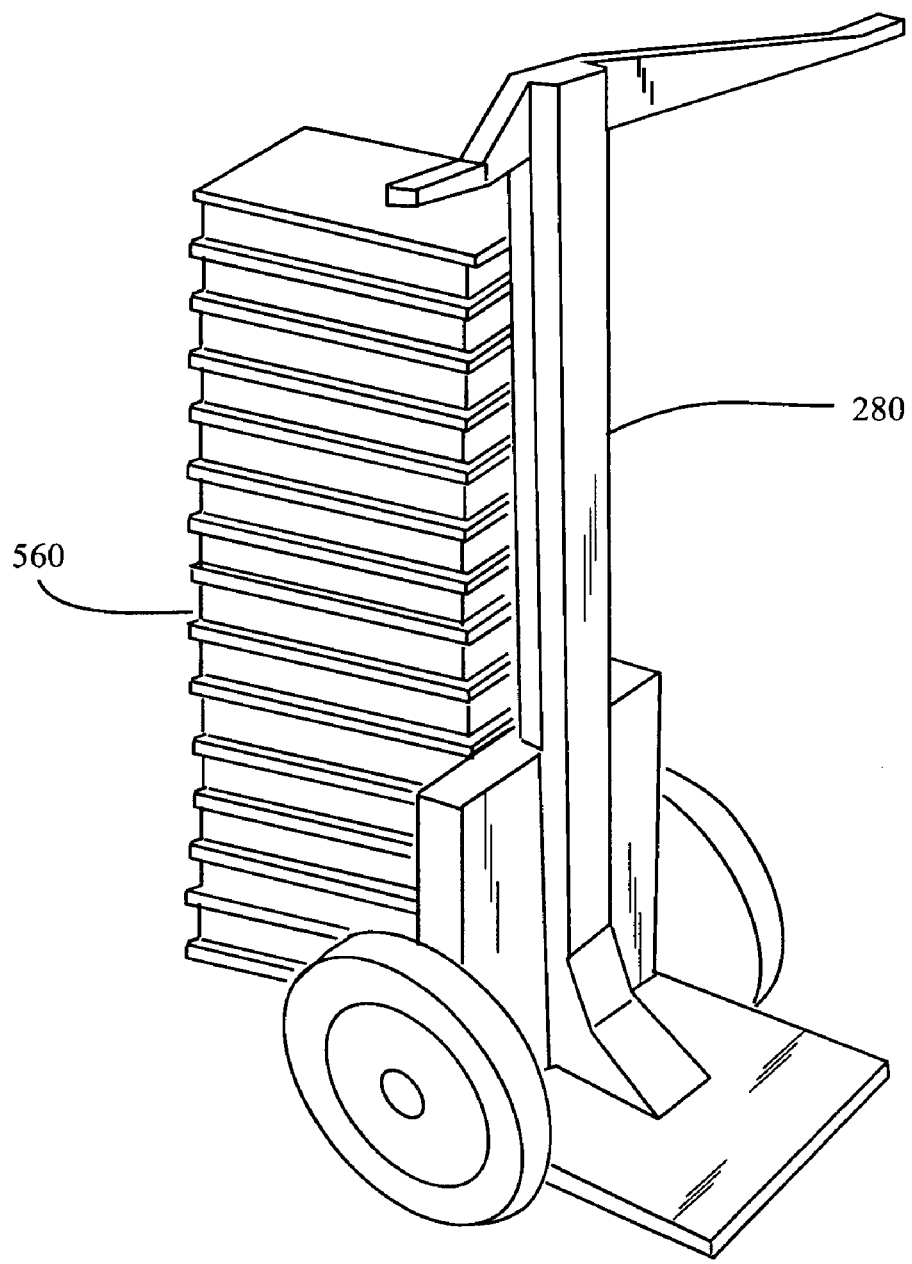
FIG. 15 is a perspective view of a battery transporter for use with inflatable electric and hybrid vehicle.

FIG. 15 describes a battery transporter 280 that is contemplated for the use of large battery arrays, which may be too heavy to lift by an individual. This allows for easy handling or transporting of the racks of battery cassettes 560 when moving them around for transport relative to recharge, maintenance, upgrade, or monitoring. Several embodiments have been contemplated, such as an articulated hand truck, a case wheeler, and the battery transporter 280 that is a Segway™-like cart which has a lifting plate that you can stack battery cassettes 560 onto and transport to areas that need power or in order to charge them.

Figure 16:
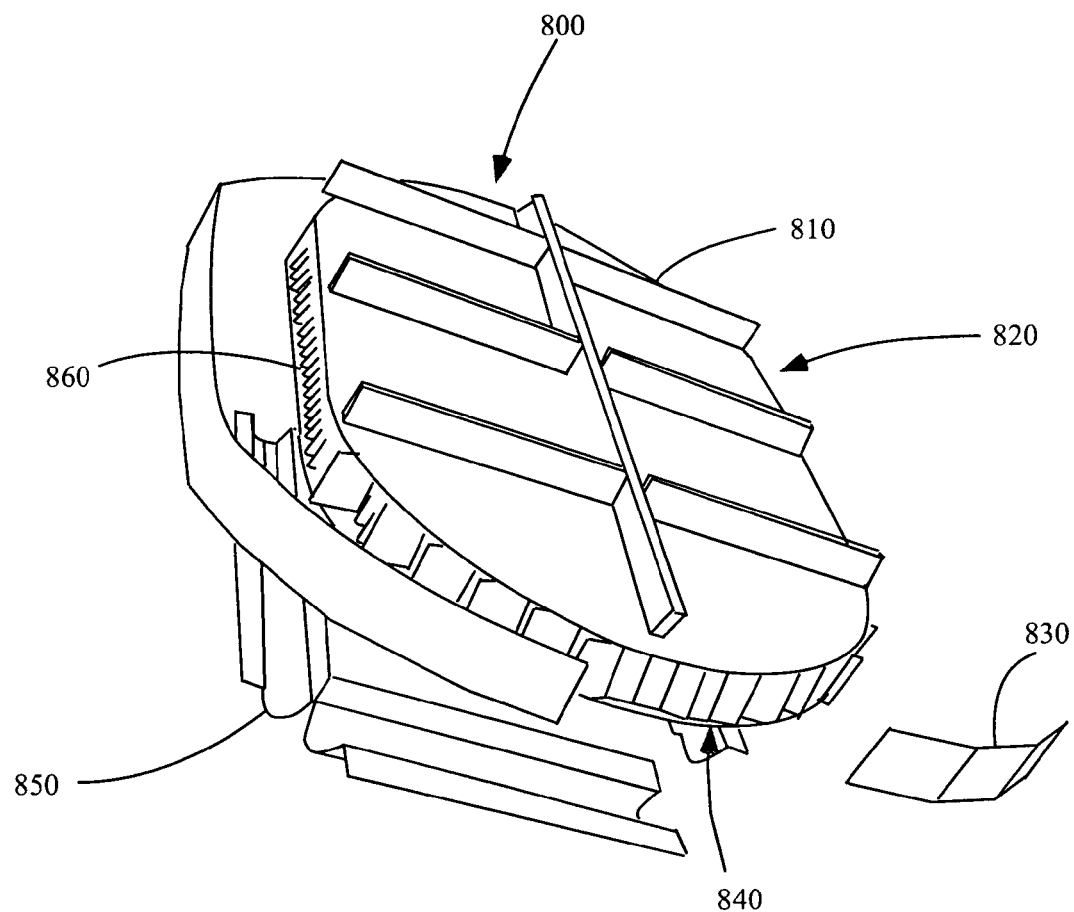
FIG. 16 is a perspective view of the inflatable electric and hybrid vehicle's floor pan assembly.

FIG. 16 is a perspective view of the floor pan assembly 800, which is an inflatable rigid weight supporting member comprising of tubes 810, a top pad 820, side covers 830, micro tubular vanes 840 attached to the top pad 820 and the bottom pad 860 forming a rigid structure wherein the top and bottom pads 820,860 are essentially parallel, so that the pan does not bow or balloon out and remains flat and supports weight without the need for a cross member. The chassis tube sleeves 850 are affixed to the bottom pad 860 to allow attachment to the chassis masts 160, not shown in this figure.

Although the figures depict an electric and hybrid vehicle system it may be contemplated in alternative embodiments to use differing components without any deviation from the inventor's intent. It will be evident that various further modifications are possible without departing from the scope of the invention as set forth in the following claims.

I claim:

1. An inflatable electric and hybrid automotive vehicle system comprising:
    a weight supporting inflatable membrane body;
    at least one seat for passengers and operators;
    at least one vehicle monitoring and control system;
    a chassis system;
    at least one energy conversion system;
    at least one energy storage system;
    at least one window; and
    running on a plurality of wheels;
    wherein said weight supporting inflatable membrane body is an inflatable membrane structure containing foam, or pressurized gas at a pressure of at least 10 p.s.i.

2. The inflatable electric and hybrid vehicle system of claim 1, wherein said weight supporting inflatable membrane body is an inflatable membrane structure comprising of a multitude of individual cells with one way valves incorporated into each, so that puncture of an individual cell will not effect the integrity of the body structure or shape.

3. The inflatable electric and hybrid vehicle system of claim 1, wherein said seat is inflatable and integrated into the weight supporting inflatable membrane body structure and further comprises an integrated occupant protecting head restraint system that increases or decreases in pressure and dimensions relative to the vehicle's speed.

4. The inflatable electric and hybrid vehicle system of claim 1, wherein said energy conversion system is either a hybrid power unit or at least one electric motor and the energy storage system is removable and can be charged or discharged remotely from the vehicle.

5. The inflatable electric and hybrid vehicle system of claim 1, wherein said vehicle monitoring system comprises an inflatable dashboard of translucent fabric with a rear projection system displaying information with a user interface that is either touch sensitive or activated by optical tracking methods that functions as a passenger restraining air bag in the event of a collision.

6. The inflatable electric and hybrid vehicle system of claim 1, wherein the vehicle control system further comprises a steering wheel mounted forward of the driver on an armature eliminating the traditional steering column, alleviating the risk of impalement during a collision, that utilizes a drive-by-wire steering control system.

7. The inflatable electric and hybrid vehicle system of claim 1, wherein the weight supporting inflatable membrane body, chassis, seating, and supporting structures are incorporated into an inflatable membrane structure forming an occupant protecting, energy damping and absorbing envelope structure that surrounds and protects the occupants during a collision.

8. The inflatable electric and hybrid vehicle system of claim 1, wherein the energy storage system is encased and surrounded by a polymer based radiation shielding housing that is explosion-proof, fire resistant, and incorporates a fire suppressant system.

9. The inflatable electric and hybrid vehicle system of claim 1, wherein the energy storage system further comprises a communication device either wireless or web based device capable of running diagnostics, updating the system's bios, or locating charging stations, battery sources or fuel depots.

10. The inflatable electric and hybrid vehicle system of claim 1, wherein the energy storage system comprises either a multi-battery modular power supply or a plurality of commonly available batteries arranged in a bank that can be installed or removed easily as individual batteries or as modular units without disengaging the charging circuit.

11. The inflatable electric and hybrid vehicle system of claim 1, wherein said energy storage system further comprises a fiber optic sensor that monitors the external dimensions of the batteries and will disengage said batteries from the circuit to prevent explosions.

12. The inflatable electric and hybrid vehicle system of claim 1, wherein said weight supporting inflatable membrane body acts as a suspension system and shock absorber.

13. The inflatable electric and hybrid vehicle system of claim 1, wherein the weigh supporting inflatable membrane body components further comprise several seamless 3d weave 10+PSI sleeved tubes sealed by a metal or composite clamp at each end to form a H-shaped structural element for supporting weight and dampening shock.

14. The inflatable electric and hybrid vehicle system of claim 1, wherein said wheel is collapsible by either irising or by spoke removal allowing for easy transportation.

15. The inflatable electric and hybrid vehicle system of claim 1, wherein each of the inflatable electric and hybrid vehicle system components are of sufficient dimensions and weight to be collapsed or disassembled or folded for shipping.

16. The inflatable electric and hybrid vehicle system of claim 1, wherein said chassis is comprised of a composite polymer.

17. The inflatable electric and hybrid vehicle system of claim 1, wherein said vehicle further comprises a pressurized beam structure used for supporting weight and dampening shock.

18. The inflatable electric and hybrid vehicle system of claim 17, wherein the pressurized beam structure further comprises an H shaped structural element.

19. The inflatable electric and hybrid vehicle system of claim 1, wherein said at least one seat is supported by said weight supporting inflatable membrane body.

* * * * *